(12) United States Patent
Kimura et al.

(10) Patent No.: US 8,788,149 B2
(45) Date of Patent: *Jul. 22, 2014

(54) STEERING CONTROL DEVICE

(75) Inventors: Yukihide Kimura, Gotenba (JP); Ryota Osumi, Sunto-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 133 days.

This patent is subject to a terminal disclaimer.

(21) Appl. No.: 13/375,605

(22) PCT Filed: Aug. 5, 2010

(86) PCT No.: PCT/JP2010/063309
§ 371 (c)(1),
(2), (4) Date: Dec. 1, 2011

(87) PCT Pub. No.: WO2012/017542
PCT Pub. Date: Feb. 9, 2012

(65) Prior Publication Data
US 2012/0277954 A1 Nov. 1, 2012

(51) Int. Cl.
*B62D 6/00* (2006.01)
(52) U.S. Cl.
USPC . 701/41; 701/1; 701/29; 701/42; 73/862.328; 180/443; 180/446; 336/119; 440/59
(58) Field of Classification Search
USPC ........ 701/1, 29, 41, 42; 73/862.328; 180/443, 180/446; 336/119; 440/59
See application file for complete search history.

(56) References Cited

U.S. PATENT DOCUMENTS

| 5,347,458 A | 9/1994 | Serizawa et al. |
| 6,302,441 B1 | 10/2001 | Kawamuro et al. |

(Continued)

FOREIGN PATENT DOCUMENTS

| DE | 101 57 944 A1 | 7/2002 |
| DE | 603 06 002 T2 | 1/2007 |

(Continued)

OTHER PUBLICATIONS

International Search Report issued on Nov. 9, 2010 in PCT/JP10/063309 filed on Aug. 5, 2010.

(Continued)

*Primary Examiner* — Muhammad Shafi
*Assistant Examiner* — Sanjeev Malhotra
(74) *Attorney, Agent, or Firm* — Oblon, Spivak, McClelland, Maier & Neustadt, L.L.P.

(57) ABSTRACT

A CPU changes a turning angle corresponding to a steering angle required for a steering device to steer a host vehicle, depending on the amount of operation for moving a steering wheel at a reference position in a tilt direction and a push-pull direction. A tilt reaction force device and a push-pull reaction force device generate a reaction force against a second operation amount for moving the steering wheel from the reference position according to the reference position of the steering wheel relative to the driver which is adjusted by a tilt/expansion mechanism. In this way, even when the reference position of the steering wheel is changed, it is possible to give an appropriate reaction force to the driver since a reaction force against, for example, an operation of pushing or pulling the steering wheel is generated according to the reference position of the steering wheel relative to the driver.

7 Claims, 15 Drawing Sheets

(56) References Cited

U.S. PATENT DOCUMENTS

| | | |
|---|---|---|
| 6,801,840 B2 | 10/2004 | Kodama et al. |
| 6,915,194 B2 | 7/2005 | Kodama et al. |
| 6,922,621 B2 | 7/2005 | Kodama et al. |
| 7,562,738 B2 | 7/2009 | Suyama et al. |
| 2002/0063015 A1 | 5/2002 | Sugitani et al. |
| 2003/0014169 A1* | 1/2003 | Kato et al. ............... 701/41 |
| 2003/0055545 A1* | 3/2003 | Uenuma et al. ........... 701/41 |
| 2003/0094054 A1* | 5/2003 | Font .................... 73/862.328 |
| 2003/0183438 A1 | 10/2003 | Higashi et al. |
| 2004/0016591 A1* | 1/2004 | Kojo et al. ............... 180/443 |
| 2004/0056748 A1* | 3/2004 | Masaki et al. ........... 336/119 |
| 2005/0027402 A1* | 2/2005 | Koibuchi et al. ........... 701/1 |
| 2005/0205345 A1* | 9/2005 | Hayashi ................... 180/446 |
| 2006/0015231 A1* | 1/2006 | Yoshimura et al. ....... 701/48 |
| 2006/0019558 A1* | 1/2006 | Mizutani et al. ........... 440/59 |
| 2007/0219691 A1 | 9/2007 | Fukuba et al. |
| 2007/0265752 A1* | 11/2007 | Hayama et al. ........... 701/41 |
| 2008/0027609 A1 | 1/2008 | Aoki et al. |
| 2008/0243339 A1* | 10/2008 | Nishimori et al. ........ 701/41 |
| 2008/0249685 A1* | 10/2008 | Hara et al. ................. 701/42 |
| 2009/0076676 A1* | 3/2009 | Yamamoto et al. ........ 701/29 |
| 2010/0030421 A1* | 2/2010 | Yoshimura et al. ....... 701/29 |
| 2010/0318264 A1 | 12/2010 | Maeda et al. |
| 2011/0320090 A1* | 12/2011 | Barthomeuf et al. ...... 701/42 |
| 2012/0089301 A1 | 4/2012 | Koizumi |
| 2012/0277954 A1 | 11/2012 | Kimura et al. |

FOREIGN PATENT DOCUMENTS

| | | |
|---|---|---|
| JP | 10-329728 | 12/1998 |
| JP | 11-310146 | 11/1999 |
| JP | 11-334628 | 12/1999 |
| JP | 2000-52997 A | 2/2000 |
| JP | 2000-203444 | 7/2000 |
| JP | 2002-160642 A | 6/2002 |
| JP | 2003 205846 | 7/2003 |
| JP | 2006-44460 | 2/2006 |
| JP | 2007 245908 | 9/2007 |
| JP | 2008 081042 | 4/2008 |
| JP | 2008-174047 A | 7/2008 |
| JP | 2008 230427 | 10/2008 |
| JP | 2008-262455 A | 10/2008 |
| JP | WO2011/013217 A1 | 2/2011 |
| WO | 2009 063502 | 5/2009 |

OTHER PUBLICATIONS

International Preliminary Report on Patentability and Written Opinion issued Feb. 16, 2012 in Application No. PCT/JP2009/063502.
Office Action mailed May 22, 2013, in co-pending U.S. Appl. No. 13/376,432.

* cited by examiner

STEERING CONTROL DEVICE

TECHNICAL FIELD

The present invention relates to a steering control device that controls the steering of a host vehicle.

BACKGROUND ART

In general, the driver rotates a steering wheel at a predetermined angle to steer the vehicle. In general, the transmission ratio of a steering angle to the rotation angle of the steering wheel is constant. However, in some cases, when the vehicle travels at a low speed, the driver wants to rotate the steering wheel at a small angle to turn the vehicle at a large angle. In addition, in some cases, when the vehicle travels at a high speed, the driver wants to reduce the steering angle with respect to the rotation angle of the steering wheel to stably drive the vehicle. Therefore, when the transmission ratio of the steering angle to the rotation angle of the steering wheel is constant, the convenience of the actual driving operation is low.

For example, Patent Literature 1 discloses a steering device in which the steering wheel can be rotated and tilted in the left-right direction. In the steering device disclosed in Patent Literature 1, the transmission ratio of the steering angle with respect to the rotation angle of the steering wheel is changed by the tilt angle of the steering wheel. In the steering device disclosed in Patent Literature 1, a reaction force corresponding to the transmission ratio changed by the tilt angle of the steering wheel is generated in a direction opposite to the tilt direction of the steering wheel.

CITATION LIST

Patent Literature

[Patent Literature 1] Japanese Unexamined Patent Application Publication No. 2008-81042

SUMMARY OF INVENTION

Technical Problem

There is a vehicle having a mechanism capable of adjusting the distance between the steering wheel and the driver according to the build or taste of the driver. However, in the above-mentioned structure, even if the distance between the steering wheel and the driver is changed, a reaction force against the tilt of the steering wheel is still generated. Therefore, in some cases, the generated reaction force is inappropriate according to the distance between the steering wheel and the driver.

The invention has been made in view of the above-mentioned problems and an object of the invention is to provide a steering control device capable of giving an appropriate reaction force to the driver.

Solution to Problem

According to the invention, a steering control device includes: a reference position adjusting unit that adjusts a reference position of a steering wheel relative to a driver; a steering unit that steers a host vehicle according to an amount of steering corresponding to a first operation amount of the steering wheel by the driver in a first direction; a steering angle change unit that changes the amount of steering corresponding to the first operation amount required for the steering unit to steer the host vehicle, depending on a second operation amount of the steering wheel by the driver in a second direction; and a reaction force generating unit that generates a reaction force against the second operation amount for moving the steering wheel from the reference position according to the reference position of the steering wheel relative to the driver which is adjusted by the reference position adjusting unit.

According to this structure, the reference position adjusting unit can adjust the reference position of the steering wheel relative to the driver. Therefore, for example, it is possible to adjust the reference position of the steering wheel so as to be close to or away from the driver, according to the taste of the driver.

The steering angle change unit changes the amount of steering corresponding to the first operation amount, such as the rotation angle of the steering wheel about the rotating shaft, which is required for the steering unit to steer the host vehicle, depending on the second operation amount for moving the steering wheel from the reference position in a direction parallel to the rotating shaft of the steering wheel or in the second direction in which the steering wheel is tilted on a predetermined fulcrum. Therefore, when the driver performs, for example, an operation of pushing or pulling the steering wheel in addition to the operation of rotating the steering wheel, it is possible to change a steering angle for the rotation angle of the steering wheel and thus freely turn the host vehicle.

The reaction force generating unit generates the reaction force corresponding to the second operation amount for moving the steering wheel from the reference position according to the reference position of the steering wheel relative to the driver which is adjusted by the reference position adjusting unit. In this way, even when the reference position of the steering wheel is changed, it is possible to give an appropriate reaction force to the driver since the reaction force against, for example, an operation of pushing or pulling the steering wheel is generated according to the reference position of the steering wheel relative to the driver.

In this case, the reaction force generating unit may increase the reaction force against the second operation amount for moving the steering wheel from the reference position as the reference position of the steering wheel relative to the driver which is adjusted by the reference position adjusting unit becomes closer to the driver, and decrease the reaction force against the second operation amount for moving the steering wheel from the reference position as the reference position of the steering wheel relative to the driver which is adjusted by the reference position adjusting unit becomes further away from the driver.

According to this structure, the reaction force generating unit increases the reaction force against the second operation amount for moving the steering wheel from the reference position as the reference position of the steering wheel relative to the driver which is adjusted by the reference position adjusting unit becomes closer to the driver. When the steering wheel is close to the driver, it is easy for the driver to increase the steering angle at a time without changing the hands holding the steering wheel. Therefore, when the reaction force is weak during the operation, a sense of incongruity is likely to occur. For this reason, as the steering wheel becomes closer to the driver, the reaction force increases, which makes it possible to prevent the occurrence of the sense of incongruity.

In addition, the reaction force generating unit decreases the reaction force against the second operation amount for moving the steering wheel from the reference position as the reference position of the steering wheel relative to the driver which is adjusted by the reference position adjusting unit becomes further away from the driver. When the steering wheel is away from the driver, the driver operates the steering wheel with arms stretched. Therefore, when the reaction force is strong during the operation, it may be difficult to operate the steering wheel with a desired operation amount. For this reason, as the steering wheel becomes further away from the driver, the reaction force is reduced, which makes it possible to operate the steering wheel with a desired second operation amount.

The steering angle change unit may change the amount of change in the amount of steering corresponding to the first operation amount required for the steering unit to steer the host vehicle depending on the second operation amount for moving the steering wheel from the reference position, according to the reference position of the steering wheel relative to the driver which is adjusted by the reference position adjusting unit.

According to this structure, the steering angle change unit changes the amount of steering corresponding to the first operation amount required for the steering unit to steer the host vehicle depending on the second operation amount for moving the steering wheel from the reference position, according to the reference position of the steering wheel relative to the driver which is adjusted by the reference position adjusting unit. In this way, even when the reference position of the steering wheel is changed, it is possible to give an appropriate amount of steering corresponding to the rotation angle of the steering wheel to the driver since the amount of steering corresponding to the rotation angle of the steering wheel is changed according to the reference position of the steering wheel relative to the driver, for example.

In this case, the steering angle change unit may decrease the amount of change in the amount of steering corresponding to the first operation amount required for the steering unit to steer the host vehicle depending on the second operation amount for moving the steering wheel from the reference position as the reference position of the steering wheel relative to the driver which is adjusted by the reference position adjusting unit becomes closer to the driver, and increase the amount of change in the amount of steering corresponding to the first operation amount required for the steering unit to steer the host vehicle depending on the second operation amount for moving the steering wheel from the reference position as the reference position of the steering wheel relative to the driver which is adjusted by the reference position adjusting unit becomes further away from the driver.

According to this structure, the steering angle change unit decreases the amount of change in the amount of steering corresponding to the first operation amount, such as the rotation angle of the steering wheel about the rotating shaft, which is required for the steering unit to steer the host vehicle, depending on the second operation amount for moving the steering wheel from the reference position as the reference position of the steering wheel relative to the driver which is adjusted by the reference position adjusting unit becomes closer to the driver. When the steering wheel is close to the driver, it is easy for the driver to increase the amount of operation for pushing or pulling the steering wheel. Therefore, when the amount of change in the steering angle corresponding to the first operation amount, such as the rotation angle of the steering wheel, according to the second operation amount for pushing or pulling the steering wheel is too large, it may be difficult to obtain a desired steering angle. For this reason, as the steering wheel becomes closer to the driver, the amount of change in the amount of steering corresponding to, for example, the rotation angle of the steering wheel is reduced, which makes it easy to obtain a desired steering angle.

In addition, the steering angle change unit increases the amount of change in the amount of steering corresponding to the first operation amount, such as the rotation angle of the steering wheel about the rotating shaft, which is required for the steering unit to steer the host vehicle depending on the second operation amount for moving the steering wheel from the reference position as the reference position of the steering wheel relative to the driver which is adjusted by the reference position adjusting unit becomes further away from the driver. When the driver is away from the steering wheel, it is difficult for the driver to increase the second operation amount for pushing or pulling the steering wheel. When the amount of change in the steering angle corresponding to the first operation amount, such as the rotation angle of the steering wheel, according to the second operation amount for pushing or pulling the steering wheel is too small, it may be difficult to obtain a desired steering angle. Therefore, as the steering wheel becomes further away from the driver, the amount of change in the amount of steering corresponding to, for example, the rotation angle of the steering wheel, increases, which makes it easy to obtain a desired steering angle.

The reference position adjusting unit may adjust the absolute height of the reference position of the steering wheel, and the reaction force generating unit may generate the reaction force against the second operation amount for moving the steering wheel from the reference position, according to the absolute height of the reference position of the steering wheel adjusted by the reference position adjusting unit.

According to this structure, the reaction force generating unit generates the reaction force against the second operation amount for moving the steering wheel from the reference position, according to the absolute height of the reference position of the steering wheel adjusted by the reference position adjusting unit. The appropriate reaction force against the second operation amount of the driver pushing or pulling the steering wheel varies depending on the build of the driver. In addition, the absolute height of the adjusted reference position of the steering wheel varies depending on the build of the driver. Therefore, the reaction force against the second operation amount for moving the steering wheel from the reference position is generated according to the absolute height of the reference position of the steering wheel. In this way, it is possible to give an appropriate reaction force to the driver.

In this case, the reference position adjusting unit may increase the reaction force against the second operation amount for moving the steering wheel from the reference position as the absolute height of the reference position of the steering wheel adjusted by the reference position adjusting unit increases, and decrease the reaction force against the second operation amount for moving the steering wheel from the reference position as the absolute height of the reference position of the steering wheel adjusted by the reference position adjusting unit decreases.

According to this structure, the reference position adjusting unit increases the reaction force against the second operation amount for moving the steering wheel from the reference position as the absolute height of the reference position of the steering wheel adjusted by the reference position adjusting unit increases. In general, it is considered that, as the driver has a larger build, the absolute height of the reference position of the steering wheel is adjusted so as to increase. In addition, it is considered that, when the driver has a larger build, a stronger reaction force is appropriate. As the absolute height of the reference position of the steering wheel increases, the reaction force against the second operation amount for moving the steering wheel from the reference position increases, which makes it possible to give an appropriate reaction force to the driver.

In addition, the reference position adjusting unit decreases the reaction force against the second operation amount for moving the steering wheel from the reference position as the absolute height of the reference position of the steering wheel adjusted by the reference position adjusting unit decreases. In general, it is considered that, as the driver has a smaller build, the absolute height of the reference position of the steering wheel is adjusted so as to be reduced. In addition, for example, when the driver is a woman or force for operating the steering wheel is likely to be relatively weak, it is considered that, as the driver has a smaller build, a weaker reaction force is appropriate. Therefore, as the absolute height of the reference position of the steering wheel is reduced, the reaction force against the second operation amount for moving the steering wheel from the reference position is reduced, which makes it possible to give an appropriate reaction force to the driver.

The reference position adjusting unit may adjust an inclination angle of the rotating shaft of the steering wheel in a front-rear direction of the host vehicle to adjust the absolute height of the reference position of the steering wheel.

According to this structure, the reference position adjusting unit adjusts the inclination angle of the rotating shaft of the steering wheel in the front-rear direction of the host vehicle to adjust the absolute height of the reference position of the steering wheel. Therefore, it is possible to adjust the height of the reference position of the steering wheel using the mechanism according to the related art which is provided in the vehicle.

The first operation amount may be a rotation angle of the steering wheel about the rotating shaft, and the second operation amount is the amount of movement of the steering wheel at the reference position in at least one of a direction parallel to the rotating shaft of the steering wheel and a direction in which the steering wheel is tilted.

Advantageous Effects of Invention

According to the steering control device of the invention, it is possible to give an appropriate reaction force to the driver.

DESCRIPTION OF EMBODIMENTS

Hereinafter, steering devices according to exemplary embodiments of the invention will be described in detail with reference to the accompanying drawings.

Figure 1:
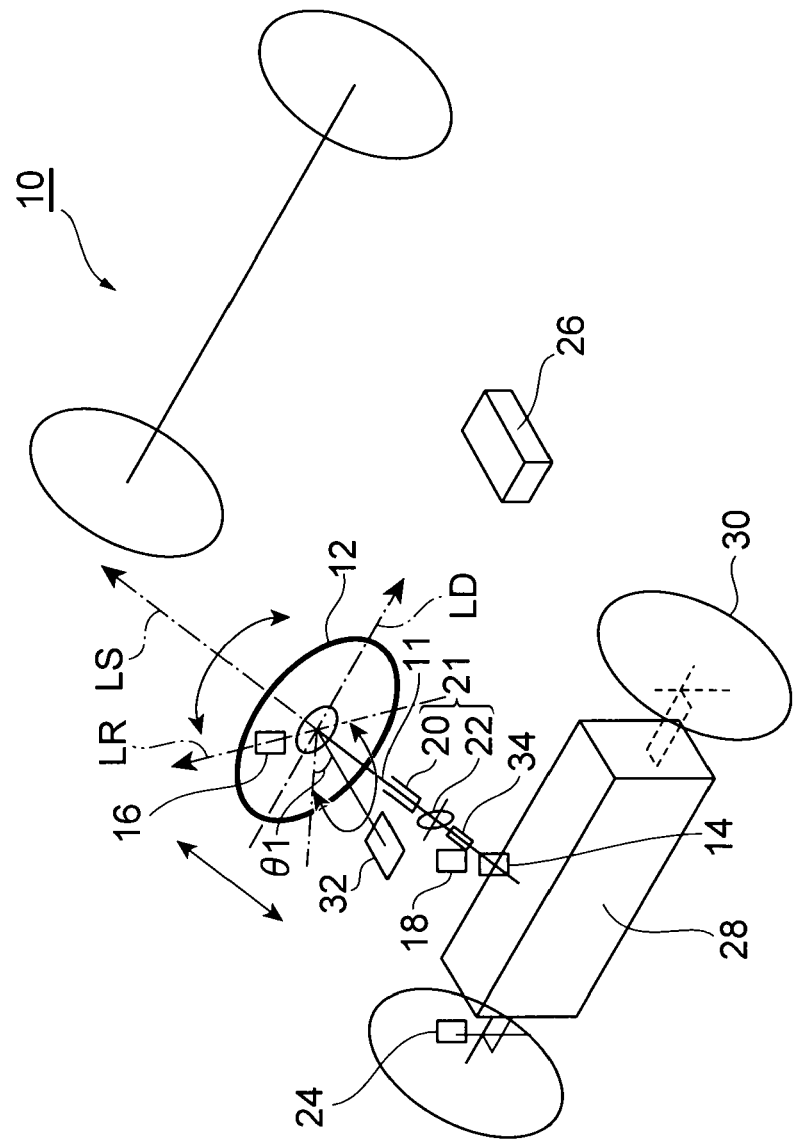
FIG. 1 is a perspective view illustrating the structure of a steering control device according to a first embodiment.

As shown in FIG. 1, a vehicle provided with a steering device 10 according to a first embodiment of the invention includes a steering shaft 11 which is connected to a steering device 28 and a steering wheel 12 which is connected to the end of the steering shaft 11. The steering wheel 12 can change a reference position (initial position) relative to the driver according to the build or taste of the driver.

Specifically, the steering shaft 11 includes a tilt/expansion mechanism 21. The tilt/expansion mechanism 21 can change the inclination angle (tilt angle) of an axis line LS of the steering shaft in the front-rear direction of the vehicle. The tilt/expansion mechanism 21 can telescopically extend and contract the steering shaft 11 and change the amount of extension and contraction (telescopic amount) of the steering shaft 11. In this way, the tilt/expansion mechanism 21 can adjust the distance between the steering wheel 12 and the driver and the height of the steering wheel 12 from the floor of a vehicle interior. The telescopic amount and the tilt angle adjusted by the tilt/expansion mechanism 21 are detected by a telescopic amount sensor 20 and a tilt angle sensor 22, respectively. In this embodiment, in addition to the telescopic amount and the tilt angle, the position of a driver's seat in the front-rear direction and the height thereof may be detected by, for example, a sensor and the reference position of the steering wheel 12 relative to the driver may be detected on the basis of the position and height.

The steering wheel 12 can be operated by a plurality of different operations. A plurality of inputs can be performed by each operation of the steering wheel 12. Specifically, the steering wheel 12 can be rotated about the axis line LS of the steering shaft 11. In the following description, this operation is referred to as the rotation of the steering wheel 12. The rotation angle of the steering wheel 12 about the axis line LS of the steering shaft 11 is detected as a steering angle MA_TEMP by a steering angle sensor 14.

The steering wheel 12 can be tilted about an axis line LR perpendicular to the axis line LS of the steering shaft 11 in the up-down direction. In the following description, this operation is referred to as the tilt of the steering wheel 12. The tilt angle $\theta 1$ of the steering shaft of the steering wheel 12 about the axis line LR is detected by a tilt angle sensor 16. The tilt torque PT of the steering shaft of the steering wheel 12 about the axis line LR is calculated by the detected value of the tilt angle sensor 16 and the dimensions of the steering wheel 12. The steering wheel 12 may be rotated about an axis line LD perpendicular to the axis line LS of the steering shaft 11 in the width direction of the vehicle. Alternatively, the steering wheel 12 may be tilted about a predetermined fulcrum of the steering shaft 11.

The steering wheel 12 may be moved in a direction parallel to the axis line LS of the steering shaft 11. In the following description, this operation is referred to as the pushing and pulling of the steering wheel 12. The push-pull stroke st of the steering wheel 12 in a direction parallel to the axis line LS of the steering shaft 11 is detected by a push-pull stroke sensor 18.

The steering control device 10 includes a tilt reaction force device 32 which gives a reaction force against the tilt operation of the steering wheel 12. The steering control device 10 includes a push-pull reaction force device 34 that gives a reaction force against the operation of pushing and pulling the steering wheel 12.

Figure 2:
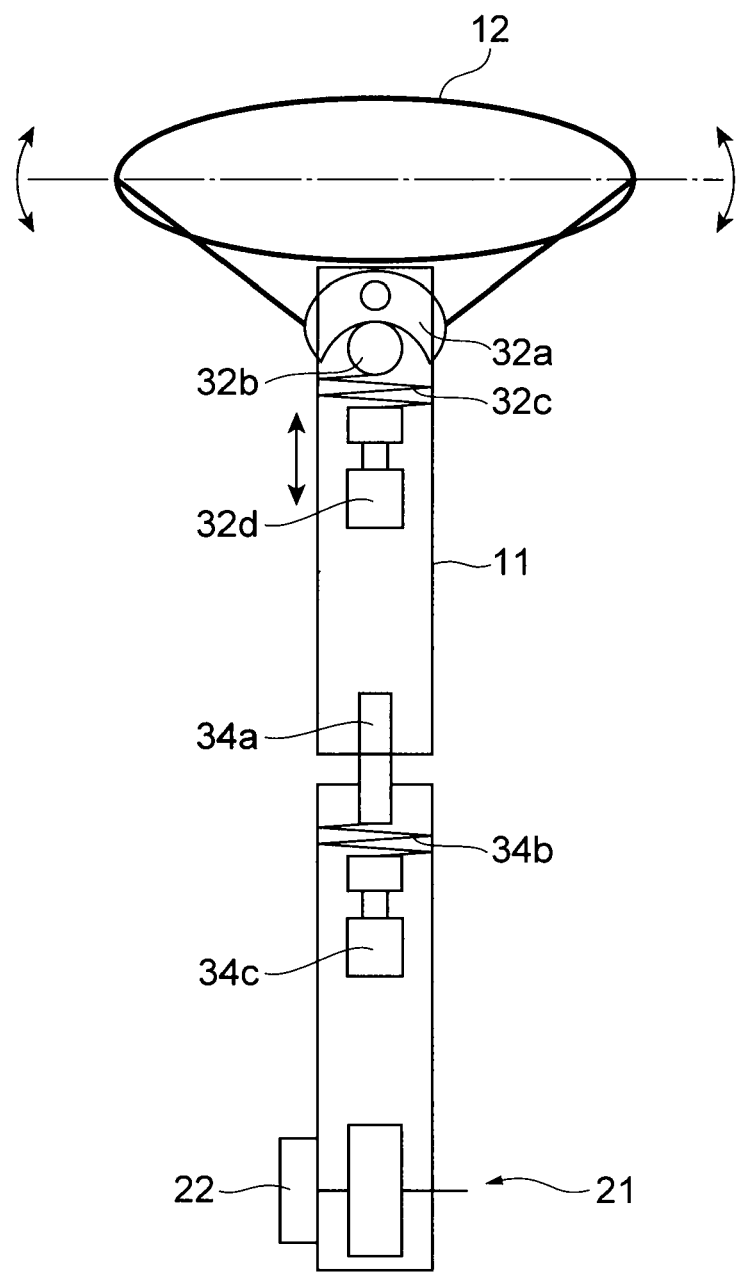
FIG. 2 is a diagram illustrating the structure of devices around a steering wheel according to the first embodiment.

As shown in detail in FIG. 2, the steering shaft 11 and the steering wheel 12 include as the tilt reaction force device 32, a cam mechanism 32a, a ball 32b, a spring 32c, and an actuator 32d. The actuator 32d adjusts a preset weight for pressing the ball 32b against the cam mechanism 32a through the spring 32c. The actuator 32d can change the preset weight for pressing the ball 32b against the cam mechanism 32a to change the reaction force in the tilt direction. In addition, a non-linear spring, such as a two-stage spring, may be used as the spring 32c. In this case, it is possible to change the spring constant of the spring 32c, in addition to the preset weight adjusted by the actuator 32d.

The steering shaft 11 and the steering wheel 12 include, as the push-pull reaction force device 34, a slide shaft 34a, a spring 34b, and an actuator 34c. The actuator 34c adjusts a preset weight for pressing the slide shaft 34a through the spring 34b. The actuator 34c can change the preset weight for pressing the slide shaft 34a to change the reaction force in the push-pull direction. In addition, a non-linear spring, such as a two-stage spring, may be used as the spring 34b. In this case, it is possible to change the spring constant of the spring 34a in addition to the preset weight adjusted by the actuator 34c.

Returning to FIG. 1, the steering control device 10 includes a vehicle speed sensor 24, a CPU 26, a steering device 28, and tires 30. The vehicle speed sensor 24 measures the rotational speed of the tires 30 to detect the speed of a host vehicle. Alternatively, in this embodiment, steering control may be performed using the wheel speed detected by the wheel speed sensor. The CPU 26 is an electronic control unit that controls the overall operation of the steering control device 10. The CPU 26 controls the operation of the steering device 28 and the steering angle of the tires 30 on the basis of detection signals from the steering angle sensor 14, the tilt angle sensor 16, the push-pull stroke sensor 18, the telescopic amount sensor 20, the tilt amount sensor 22, and the vehicle speed sensor 24, which will be described below. In addition, the CPU 26 controls the operations of the tilt reaction force device 32 and the push-pull reaction force device 34 on the basis of detection signals from the telescopic amount sensor 20 and the tilt amount sensor 22, thereby controlling the reaction force in the tilt direction and the reaction force in the push-pull direction.

Figure 3:
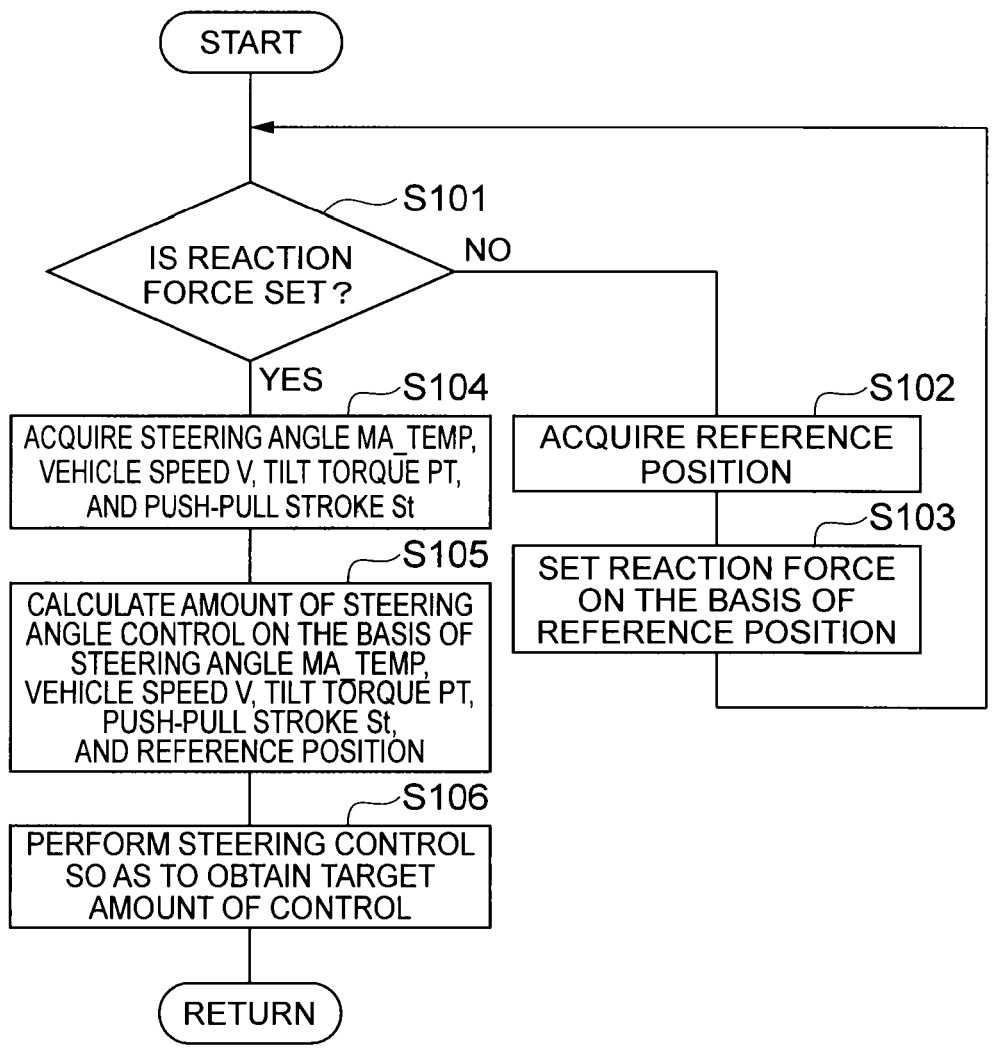
FIG. 3 is a flowchart illustrating the operation of the steering control device according to the first embodiment.

Next, the operation of the steering control device 10 according to this embodiment will be described. First, the overall operation of the steering control device 10 will be described with reference to FIG. 3. Each control process is repeatedly performed at a predetermined timing by the CPU 26. As shown in FIG. 3, when the reaction force in the tilt direction and the push-pull direction is not set on the basis of the reference position of the steering wheel 12 relative to the driver (S101), the CPU 26 acquires the reference position of the steering wheel 12 using the telescopic amount sensor 20 and the tilt amount sensor 22 (S102). The CPU 26 sets the reaction force of the steering wheel 12 in the tilt direction and the push-pull direction on the basis of the detected reference position of the steering wheel 12, which will be described below (S103).

When the reaction force has already been set (S101), the CPU 26 acquires the steering angle MA_TEMP, the vehicle speed V, the tilt torque PT, and the push-pull stroke St using the steering angle sensor 14, the tilt angle sensor 16, the push-pull stroke sensor 18, and the vehicle speed sensor 24 (S104). The CPU 26 calculates the amount of steering angle control on the basis of the steering angle MA_TEMP, the vehicle speed V, the tilt torque PT, the push-pull stroke St, and the reference position of the steering wheel 12, which will be described below (S105). The CPU 26 drives the steering device 28 to perform steering angle control such that a target control amount is obtained (S106).

Figure 4:
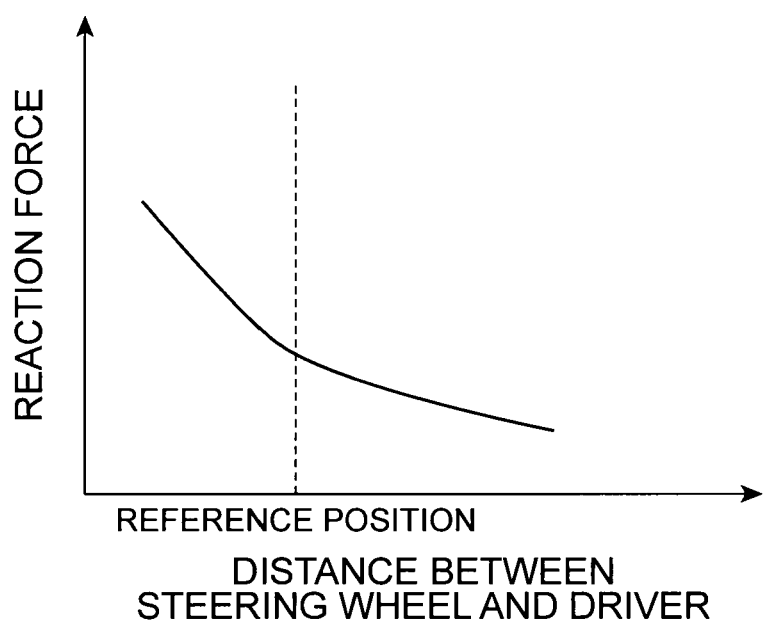
FIG. 4 is a graph illustrating the relation between the reference position of the steering wheel and a reaction force.

Next, the reaction force setting process in Step S103 will be described. In Step S103, the CPU 26 sets the reaction force of the steering wheel 12 in the tilt direction and the push-pull direction on the basis of the detected reference position of the steering wheel 12 and a reaction force map shown in FIG. 4. In this case, the detected value of the telescopic amount sensor 20 may be used as the reference position. As shown in FIG. 4, as the reference position of the steering wheel 12 becomes closer to the driver, the reaction force in the tilt direction and the push-pull direction increases. As the reference position of the steering wheel 12 becomes further away from the driver, the reaction force in the tilt direction and the push-pull direction is reduced.

Figure 5:
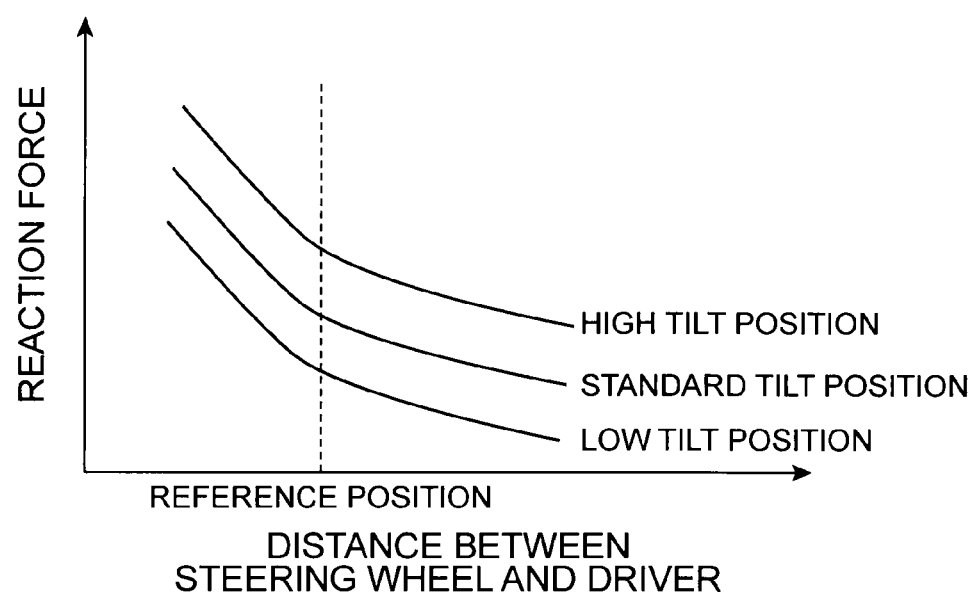
FIG. 5 is a graph illustrating the relation between the reference position of the steering wheel and the reaction force when the tilt position of the steering wheel is changed.

In Step S103, the CPU 26 sets the reaction force of the steering wheel 12 in the tilt direction and the push-pull direction on the basis of the detected reference position of the steering wheel 12, the tilt angle of the steering wheel 12, and a reaction force map shown in FIG. 5. As shown in FIG. 5, as the tilt angle and height of the steering wheel 12 increase, the reaction force in the tilt direction and the push-pull direction increases. As the tilt angle and height of the steering wheel 12 decrease, the reaction force in the tilt direction and the push-pull direction decreases.

Figure 6:
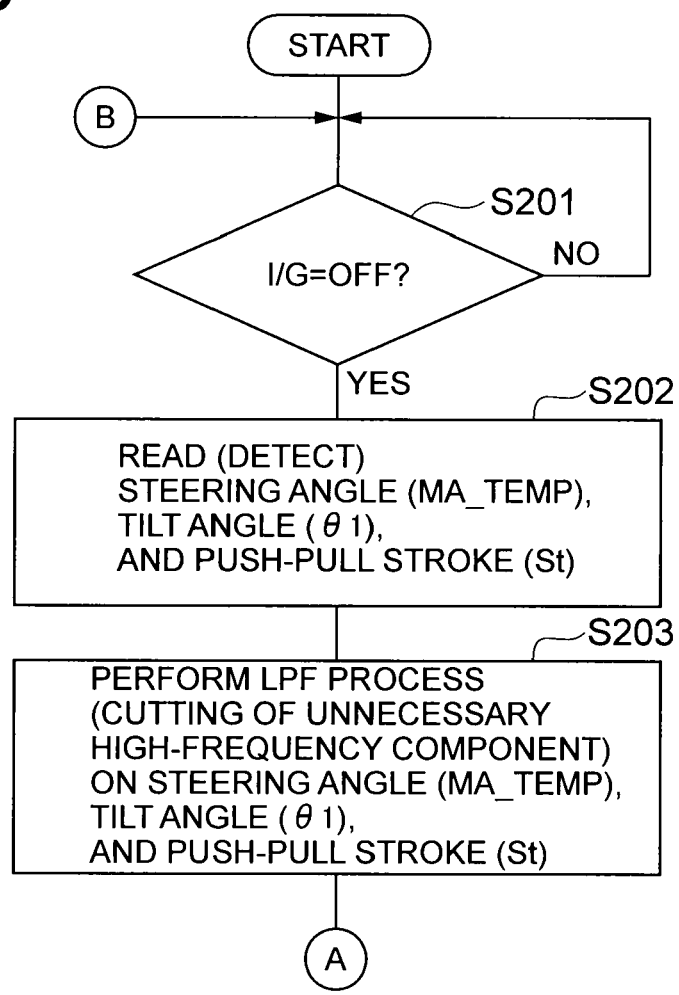
FIG. 6 is a flowchart illustrating the details of a steering control operation of the steering control device according to the first embodiment.

Next, the steering angle control operation in Steps S104 to S106 will be described. As shown in FIG. 6, the CPU 26 determines whether I/G is turned on, that is, the engine starts (S201). When it is determined in Step S201 that JIG is turned off, Step S201 is repeated. On the other hand, when it is determined in Step S201 that JIG is turned on, the CPU 26 reads the detected values from various kinds of sensors (S202). Specifically, the CPU 26 reads the steering angle MA_TEMP, the tilt angle θ1, the push-pull stroke St, and the vehicle speed V. In the following description, among the inputs by the operation of the steering wheel 12, the steering angle MA_TEMP, which is an input by a rotating operation, is used as a first input and the inputs by the other operations, that is, the tilt angle θ1, which is an input by a tilt operation, and the push-pull stroke St, which is an input by a push-pull operation, are used as second inputs.

Then, the CPU 26 performs a low-pass filter (LPF) process on the steering angle MA_TEMP, the tilt angle θ1, and the push-pull stroke St (S203). The LPF process that cuts unnecessary high-frequency components from the second inputs can be performed to reduce inputs at a high frequency. The LPF process may be performed on at least the second input and the LPF process does not have to be performed on the first input.

Figure 7:
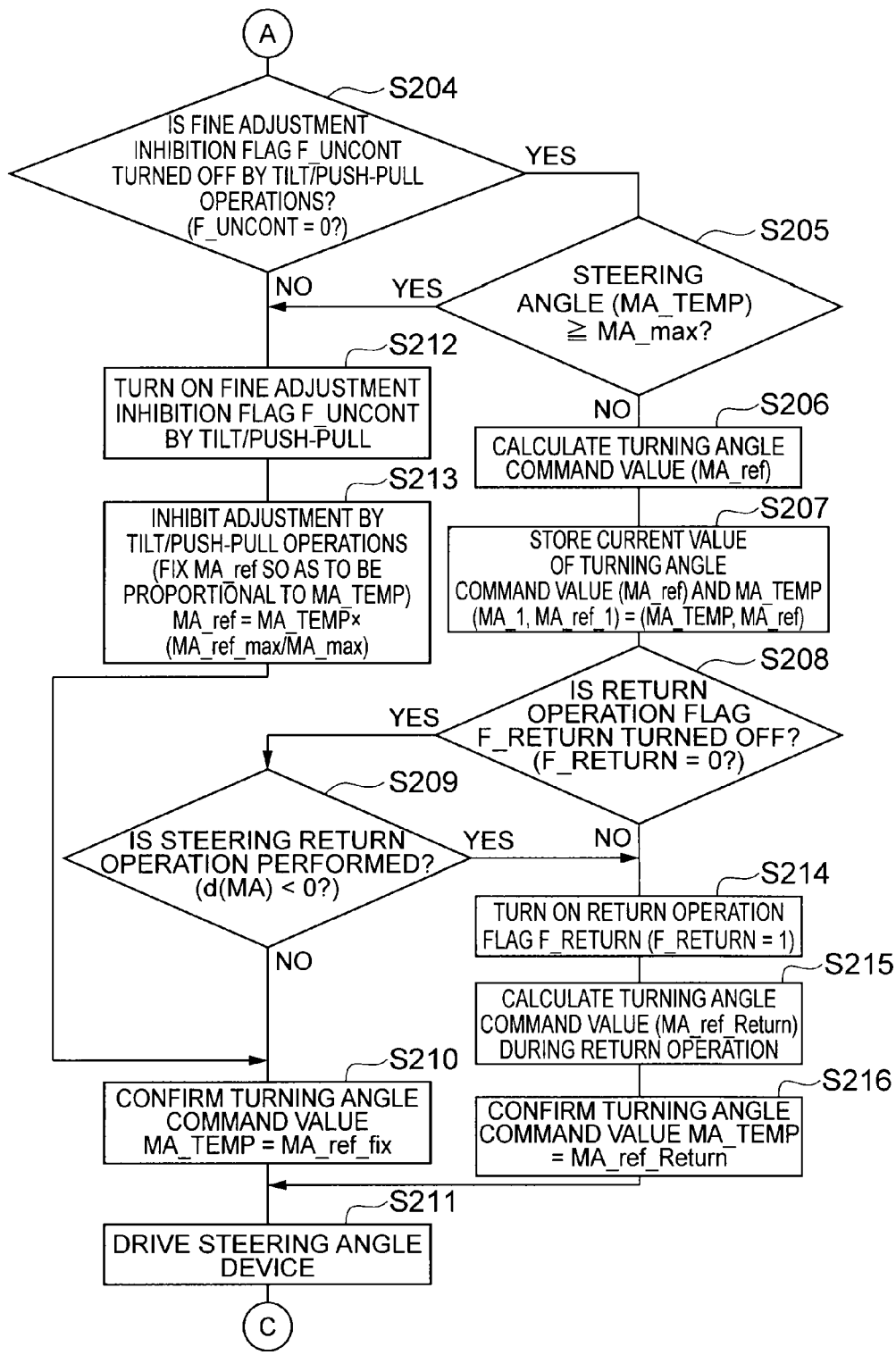
FIG. 7 is a flowchart illustrating the details of the steering control operation of the steering control device according to the first embodiment.

As shown in FIG. 7, the CPU 26 determines whether a fine adjustment inhibition flag F_UNCOUNT is turned off by the second inputs, that is, tilt/push-pull operations (S204). In the fine adjustment, a large steering process by the steering device 28 is performed on the basis of the rotation of the steering wheel 12, which is the first input, and the fine adjustment of steering is performed on the basis of the tilt/push-pull of the steering wheel 12, which is the second input.

When the fine adjustment inhibition flag F_UNCONT is 0, it may be determined that the fine adjustment is not inhibited. When the fine adjustment inhibition flag F_UNCONT is not 0, it may be determined that the fine adjustment is inhibited.

When it is determined in S204 that the fine adjustment is not inhibited, the CPU 26 determines whether the steering angle MA_TEMP is equal to or more than a predetermined threshold value $MA_{max}$ which is preset for the steering angle (Step S205). When it is determined in S205 that the steering angle MA_TEMP is not equal to or more than the threshold value $MA_{max}$, it is determined that the steering process of the steering device 28 is performed considering the fine adjustment based on the tilt/push-pull of the steering wheel 12, which are the second inputs and the CPU 26 calculates a turning command value MA_ref of a main vehicle M1 (S206).

The turning command value MA_ref is a steering value used for the control of the steering device 28. In normal control, the actual steering angle is used for control. However, in this embodiment, the turning command value MA_ref obtained by adding or subtracting the influence of a tilt or push-pull operation to or from the actual steering angle is used for control.

Figure 9:
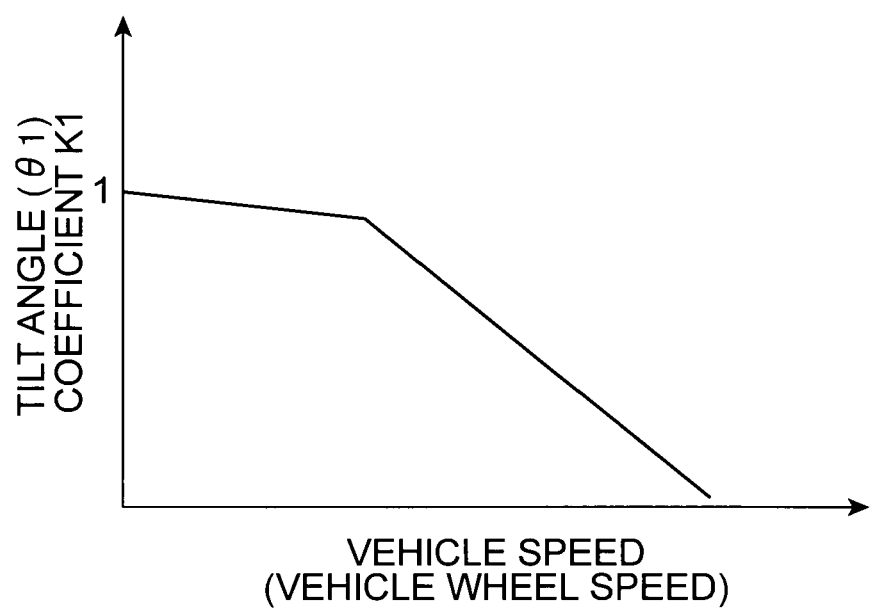
FIG. 9 is a graph illustrating the relation between a vehicle speed and a tilt angle coefficient K1.
Figure 10:
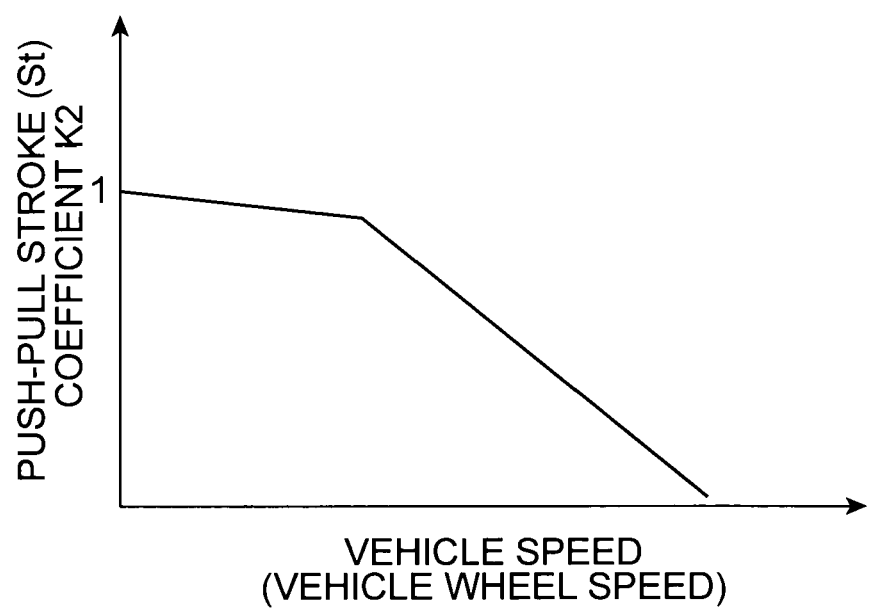
FIG. 10 is a graph illustrating the relation between the vehicle speed and a push-pull stroke coefficient K2.
Figure 11:
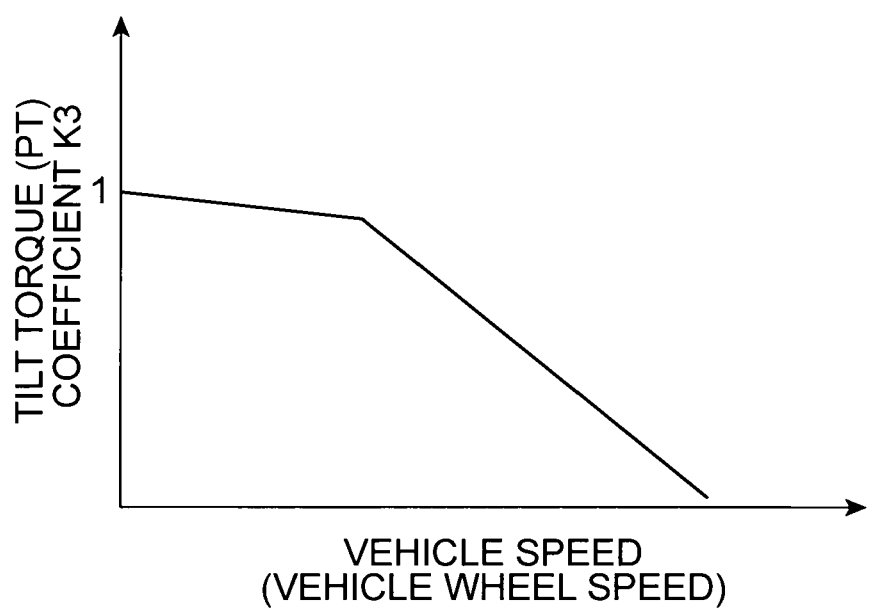
FIG. 11 is a graph illustrating the relation between the vehicle speed and a tilt torque coefficient K3.

In Step S206, the CPU 26 calculates the turning command value MA_ref with respect to the steering angle MA_TEMP on the basis of a tilt angle (θ1) coefficient K1 which varies depending on the vehicle speed V as shown in FIG. 9, a push-pull stroke (St) coefficient K2 which varies depending on the vehicle speed V as shown in FIG. 10, and a tilt torque (PT) coefficient K3 which varies depending on the vehicle speed V as shown in FIG. 11 using, for example, the following Expression 1.

MA_ref=(MA_TEMP)+MA(10 degrees)·(Kst1·K1·α× θ1/θmax)+MA(10 degrees)·(Kst2·K2·α×St/St-max)+MA(10 degrees)·(K3·α×PT/PTmax)   [Expression 1]

In this embodiment, when the maximum values of the tilt angle θ1, the push-pull stroke St, and the tilt torque PT are θmax, Stmax, and PTmax, respectively, the turning angle corresponding to θ1=θmax, St=Stmax, and PT=PTmax is equal to a turning angle MA (10 degrees), for example, when the steering angle MA_TEMP is 10 degrees. In the above-mentioned Expression 1, the gain is set with a constant α. The constant α may be, for example, 0.05. In the above-mentioned Expression 1 and as shown in FIGS. 9 to 11, the coefficients K1 to K3 are set such that the amount of adjustment is reduced as the vehicle speed increases. In this way, the sense of incongruity of the driver is reduced.

Figure 14:
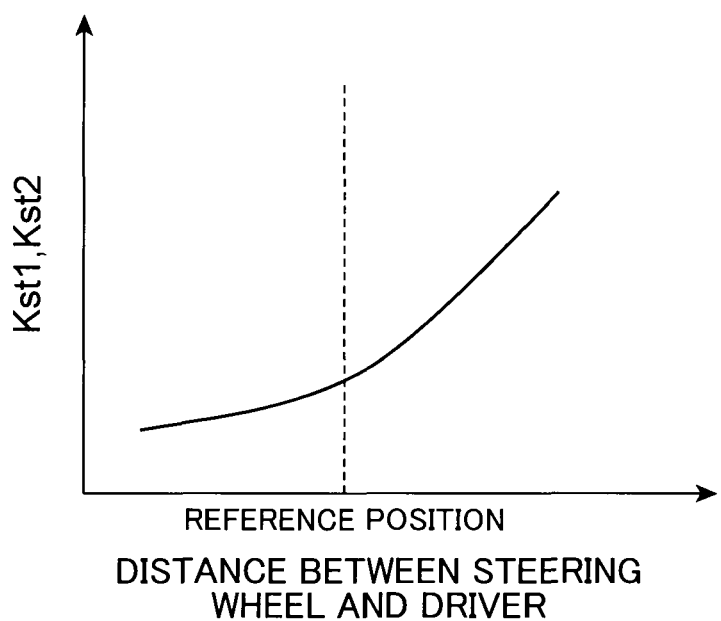
FIG. 14 is a graph illustrating the relation between the reference position of the steering wheel and transmission ratio change coefficients Kst1 and Kst2.

As shown in FIG. 14, in Expression 1, the coefficients Kst1 and Kst2 increase as the height of the reference position of the steering wheel 12 relative to the driver increases and the steering wheel 12 becomes further away from the driver, such that the amount of adjustment of the turning angle by the tilt and push-pull of the steering wheel 12 increases. On the other hand, the coefficients Kst1 and Kst2 decrease as the height of the reference position of the steering wheel 12 relative to the driver decreases and the steering wheel 12 becomes closer to the driver, such that the amount of adjustment of the turning angle by the tilt and push-pull of the steering wheel 12 decreases.

Figure 12:
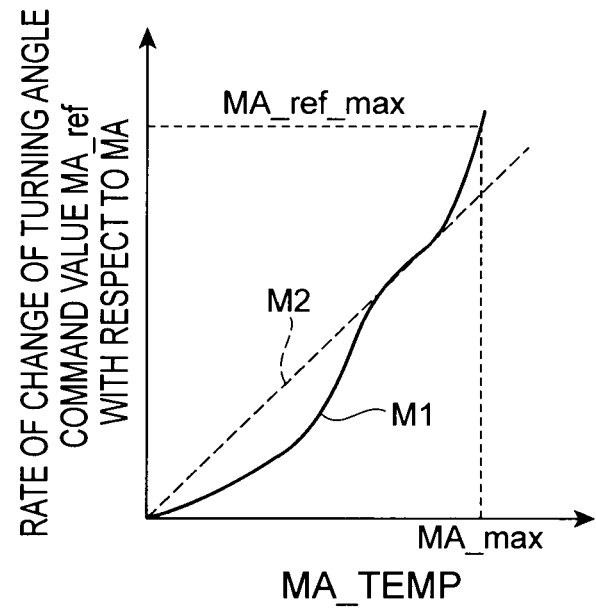
FIG. 12 is a graph illustrating the relation between a steering angle MA_TEMP and a turning angle command value MA_ref when the steering angle MA_TEMP increases.

For example, in FIG. 12, M1 indicates the relation between the steering angle MA_TEMP and the turning command value MA_ref when the fine adjustment is performed by the second inputs. In addition, M2 indicates the relation between the steering angle MA_TEMP and the turning command value MA_ref when no value is added to or subtracted from the steering angle. After the calculation, the CPU 26 stores the current value (MA_ref) of the turning angle command value of the host vehicle and the steering angle MA_TEMP (Step S207).

In order to determine whether an operation of returning the steering wheel 12 is performed, the CPU 26 determines whether a return operation flag F_RETURN is turned off (Step S208). When it is determined in Step S208 that the return operation flag F_RETURN is not 0, the CPU 26 determines that the return operation flag F_RETURN is turned off. Then, the CPU 26 determines whether the driver performs the operation of returning the steering wheel 12 (Step S209). In S209, when d(MA)<0 is not satisfied, the CPU 26 determines that the return operation is not performed.

Figure 8:
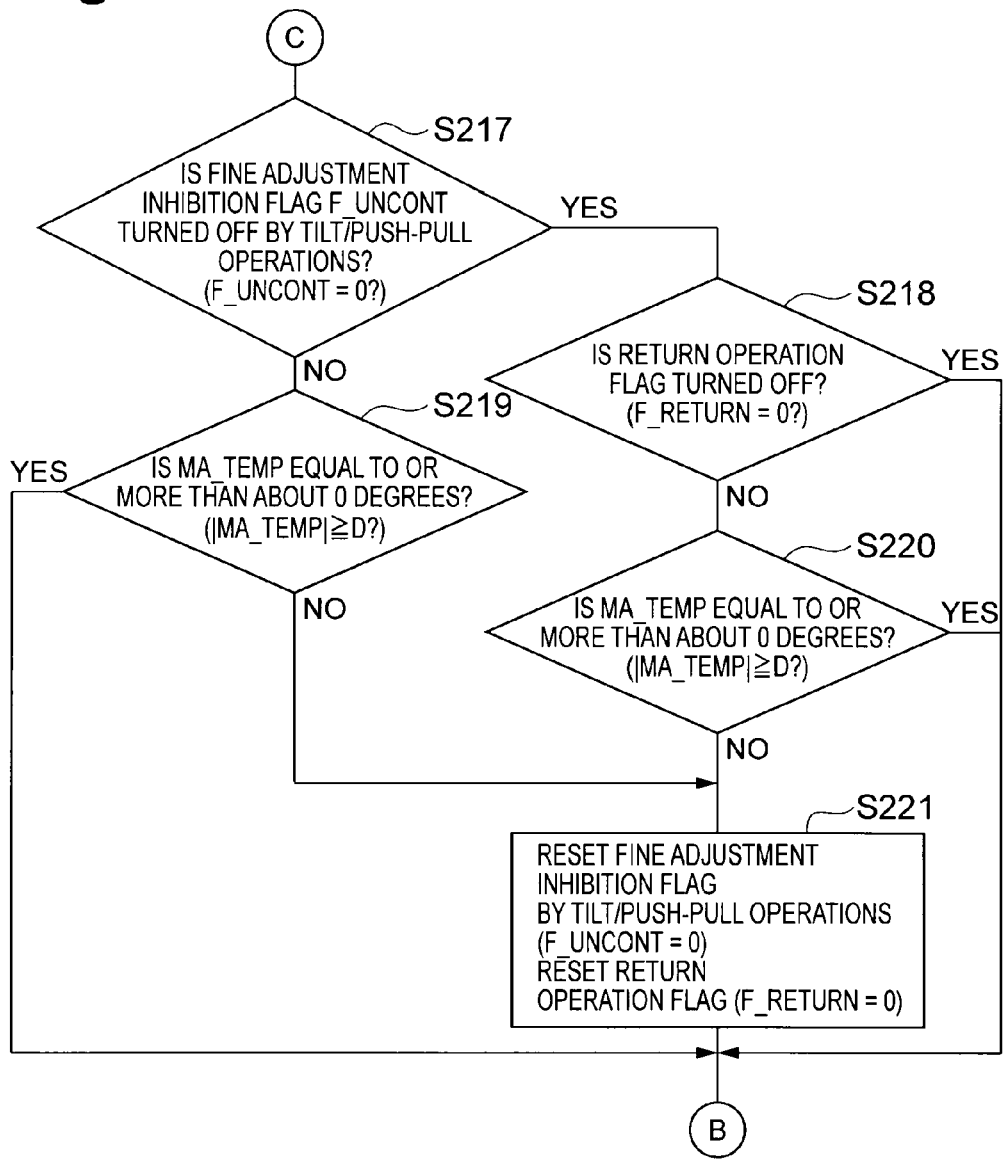
FIG. 8 is a flowchart illustrating the details of the steering control operation of the steering control device according to the first embodiment.

When it is determined in Step S209 that the return operation is not performed, the CPU 26 sets MA_TEMP=MA_ref_fix and confirms the turning angle command value of the host vehicle (Step S210). In this embodiment, it is assumed that the value stored in Step S207 is the turning angle command value. When the turning angle command value is confirmed, the CPU 26 outputs a control signal to the steering device 28 on the basis of the confirmed value and drives the steering device 28 (S211). When Step S211 ends, a control process shown in FIG. 8 is performed.

On the other hand, when it is determined in Step S204 that the fine adjustment inhibition flag F_UNCONT is not 0 or when it is determined in Step S205 that the steering angle MA_TEMP is equal to or more than $MA_{max}$, the CPU 26 sets the fine adjustment inhibition flag F_UNCONT to 1 and turns on the fine adjustment inhibition flag F_UNCONT (S212). Then, the CPU 26 performs a process of inhibiting the fine adjustment in the steering of the host vehicle by the second input on the host vehicle to calculate a main vehicle turning angle command value MA_ref (S213). Specifically, the CPU 26 calculates the main vehicle turning angle command value MA_ref so as to be proportional to the steering angle MA_TEMP. Specifically, the CPU 26 may calculate MA_ref=MA_TEMP×(MA_ref$_{max}$/MA$_{max}$). The CPU 26 confirms the turning angle command value (S210) and drives the steering device 28 using the confirmed value (S211). When Step S211 ends, the control process shown in FIG. 8 is performed.

When it is determined in Step S208 that the return operation flag F_RETURN is 0 and is turned on or when it is determined in Step S209 that d(MA)<0 is satisfied and the operation of returning the steering wheel 12 is performed, the CPU 26 sets the return operation flag F_RETURN to 1 and turns on the flag (S214). Then, the CPU 26 calculates a turning angle command value MA_ref_Return during the operation of returning the steering wheel 12 (Step S215). In step S215, the CPU 26 does not perform adjustment using the second input by the tilt or push-pull operation and maintains the gear ratio to be constant with respect to the steering angle such that the turning angle command value linearly returns to a zero point with respect to the steering angle by the return operation.

Figure 13:
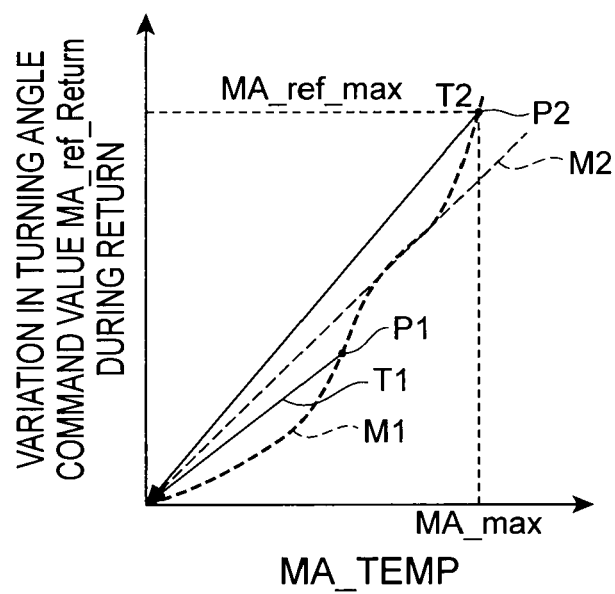
FIG. 13 is a graph illustrating the relation between the steering angle MA_TEMP and a turning angle command value MA_ref_Return when the steering angle MA_TEMP returns.

Specifically, as shown in FIG. 13, when the return operation occurs at a point P1, the turning angle command value returns along a straight line T1. When the return operation occurs at a point P2, the turning angle command value returns along a straight line T2. The turning angle command value MA_ref_Return during the return operation of the steering wheel 12 is calculated by, for example, Expression 2. In Expression 2, MA_ref_1 is the turning angle command value at the time when the return operation of the steering wheel 12 occurs. In Expression 2, MA_1 is the rotation angle of the steering wheel 12 at the time when the return operation of the steering wheel 12 occurs, and MA_TEMP=MA_1 is established in practice.

$$MA\_ref\_Return = MA\_TEMP \cdot (MA\_ref\_1 / MA\_1) \quad \text{[Expression 2]}$$

Then, the CPU 26 sets MA_TEMP=MA_ref_Return to confirm the main vehicle turning angle command value during the return operation (S216) and drives the steering device 28 using the confirmed value (S211). When Step S211 ends, the control process shown in FIG. 8 is performed.

Next, the control process shown in FIG. 8 will be described. The CPU 26 determines whether the fine adjustment inhibition flag F_UNCONT is turned off by the second inputs (S217). When the fine adjustment inhibition flag F_UNCONT is 0, it is determined that the flag is turned off. In this case, the CPU 26 determines whether the return operation flag F_RETURN is turned off (S218). When the return operation flag F_RETURN is 0, it is determined that the flag is turned off. When it is determined in S218 that the flag is turned off, the process shown in FIGS. 6 to 8 ends and the control process restarts from Step S201.

On the other hand, when it is determined in Step S217 that the fine adjustment inhibition flag F_UNCONT is not 0 and the flag is turned on, or when it is determined in Step S218 that the return operation flag F_RETURN is not 0 and the flag is turned on, it is determined whether the steering angle MA_TEMP is equal to or more than about 0 degrees (S219 and S220). In Steps S219 and S220, the CPU 26 determines whether |MA_TEMP|≥D is satisfied (where D is a value around 0 degrees at which it is considered that the host vehicle travels substantially straight and may be arbitrarily set). When it is determined in Steps S219 and S220 that the steering angle MA_TEMP is equal to or more than about 0 degrees, it is determined that the host vehicle does not travel straight and the flag is maintained. Then, the process shown in FIGS. 6 to 8 ends and the control process restarts from Step S201.

On the other hand, when it is determined in Steps S219 and S220 that the steering angle MA_TEMP is about 0 degrees, it is determined that the host vehicle travels straight and the fine adjustment inhibition flag F_UNCONT and the return operation flag F_RETURN are reset (set to 0) (S221). When Step S221 ends, the process shown in FIGS. 6 to 8 ends and the control process restarts from Step S201.

In this embodiment, the tilt/expansion mechanism 21 can adjust the reference position of the steering wheel 12 relative to the driver. Therefore, for example, it is possible to adjust the reference position of the steering wheel to be close to or away from the driver according to the taste of the driver.

The CPU 26 changes a turning angle corresponding to the steering angle MA_TEMP required for the steering device 28 to steer the host vehicle, depending on the amount of operation for moving the steering wheel 12 in the tilt direction or the push-pull direction at the reference position. Therefore, when the driver performs, for example, an operation of pushing or pulling the steering wheel 12 in addition to the operation of rotating the steering wheel 12, it is possible to change a steering angle corresponding to the rotation angle of the steering wheel 12 and thus freely turn the host vehicle.

The tilt reaction force device 32 and the push-pull reaction force device 34 generate a reaction force against a second operation amount for moving the steering wheel 12 from the reference position, according to the reference position of the steering wheel 12 relative to the driver which is adjusted by the tilt/expansion mechanism 21. In this way, even when the reference position of the steering wheel 12 is changed, it is possible to give an appropriate reaction force to the driver since the reaction force against, for example, the operation of pushing or pulling the steering wheel 12 is generated according to the reference position of the steering wheel 12 relative to the driver.

According to this embodiment, the tilt reaction force device 32 and the push-pull reaction force device 34 increase the reaction force against the second operation amount for moving the steering wheel 12 from the reference position as the reference position of the steering wheel 12 relative to the driver which is adjusted by the tilt/expansion mechanism 21 becomes closer to the driver. When the steering wheel 12 is close to the driver, it is easy for the driver to increase the steering angle at a time without changing the hands holding the steering wheel 12. Therefore, when the reaction force is weak during the operation, a sense of incongruity is likely to occur. For this reason, as the steering wheel 12 becomes closer to the driver, the reaction force increases, which makes it possible to prevent the occurrence of the sense of incongruity.

The tilt reaction force device 32 and the push-pull reaction force device 34 decrease the reaction force against the second operation amount for moving the steering wheel 12 from the reference position as the reference position of the steering wheel 12 relative to the driver which is adjusted by the tilt/expansion mechanism 21 is further away from the driver. When the steering wheel 12 is away from the driver, the driver operates the steering wheel 12 with arms stretched. Therefore, when the reaction force is strong during the operation, it may be difficult to operate the steering wheel with a desired second operation amount. For this reason, as the steering wheel 12 becomes further away from the driver, the reaction force is reduced, which makes it possible to operate the steering wheel with a desired second operation amount.

The CPU 26 changes a turning angle corresponding to the steering angle MA_TEMP of the steering wheel 12 required for the steering device 28 to steer the host vehicle depending on the second operation amount for changing the steering wheel 12 from the reference position, according to the reference position of the steering wheel 12 relative to the driver which is adjusted by the tilt/expansion mechanism 21. In this way, even when the reference position of the steering wheel 12 is changed, it is possible to give an appropriate steering angle corresponding to the rotation angle of the steering wheel 12 to the driver since the steering angle corresponding to the rotation angle of the steering wheel 12 is changed depending on the reference position of the steering wheel 12 relative to the driver.

The CPU 26 reduces the amount of change in a turning angle corresponding to the steering angle MA_TEMP of the steering wheel 12 required for the steering device 28 to steer the host vehicle according to the second operation amount for moving the steering wheel 12 from the reference position as the reference position of the steering wheel 12 relative to the driver which is adjusted by the tilt/expansion mechanism 21 becomes closer to the driver. When the steering wheel 12 is close to the driver, it is easy for the driver to increase the second operation amount for pushing or pulling the steering wheel 12. Therefore, when the amount of change in the steering angle corresponding to the rotation angle of the steering wheel 12 according to the second operation amount for pushing or pulling the steering wheel 12 is too large, it may be difficult to obtain a desired steering angle. As the steering wheel 12 becomes closer to the driver, the amount of change in the steering angle corresponding to the rotation angle of the steering wheel 12 is reduced, which makes it easy to obtain a desired steering angle.

The CPU 26 increases the amount of change in the steering angle corresponding to the steering angle MA_TEMP of the steering wheel 12 required for the steering device 28 to steer the host vehicle according to the second operation amount for moving the steering wheel 12 from the reference position as the reference position of the steering wheel 12 relative to the driver which is adjusted by the tilt/expansion mechanism 21 becomes further away from the driver. When the driver is away from the steering wheel 12, it is difficult for the driver to increase the second operation amount for pushing or pulling the steering wheel 12. When the amount of change in the steering angle corresponding to the rotation angle of the steering wheel 12 according to the second operation amount for pushing or pulling the steering wheel 12 is too small, it may be difficult to obtain a desired steering angle. Therefore, as the steering wheel 12 becomes further away from the driver, the amount of change in the steering angle corresponding to the rotation angle of the steering wheel 12 increases, which makes it easy to obtain a desired steering angle.

The tilt reaction force device 32 and the push-pull reaction force device 34 generate the reaction force against the second operation amount for moving the steering wheel 12 from the reference position according to the absolute height of the reference position of the steering wheel 12 adjusted by the tilt/expansion mechanism 21. An appropriate reaction force against the operation amount of the driver pushing or pulling the steering wheel 12 varies depending on the build of the driver. In addition, the absolute height of the adjusted reference position of the steering wheel 12 varies depending on the build of the driver. Therefore, the reaction force against the second operation amount for moving the steering wheel 12 from the reference position is generated according to the absolute height of the reference position of the steering wheel 12. In this way, it is possible to give an appropriate reaction force to the driver.

The tilt reaction force device 32 and the push-pull reaction force device 34 increase the reaction force against the second operation amount for moving the steering wheel 12 from the reference position as the absolute height of the reference position of the steering wheel 12 adjusted by the tilt/expansion mechanism 21 increases. In general, it is considered that, as the driver has a larger build, the absolute height of the reference position of the steering wheel 12 is adjusted so as to increase. In addition, it is considered that, when the driver has a larger build, a stronger reaction force is appropriate. As the absolute height of the reference position of the steering wheel 12 increases, the reaction force against the second operation amount for moving the steering wheel 12 from the reference position increases, which makes it possible to give an appropriate reaction force to the driver.

The tilt reaction force device 32 and the push-pull reaction force device 34 reduce the reaction force against the second operation amount for moving the steering wheel 12 from the reference position as the absolute height of the reference position of the steering wheel 12 adjusted by the tilt/expansion mechanism 21 is reduced. In general, it is considered that, as the driver has a smaller build, the absolute height of the reference position of the steering wheel 12 is adjusted so as to be reduced. In addition, for example, when the driver is a woman or force for operating the steering wheel 12 is likely to be relatively weak, it is considered that, as the driver has a smaller build, a weaker reaction force is appropriate. Therefore, as the absolute height of the reference position of the steering wheel 12 is reduced, the reaction force against the second operation amount for moving the steering wheel 12 from the reference position is reduced, which makes it possible to give an appropriate reaction force to the driver.

The tilt/expansion mechanism 21 can adjust the tilt angle of the steering wheel 12 to adjust the absolute height of the reference position of the steering wheel 12. Therefore, it is possible to adjust the height of the reference position of the steering wheel 12 using the mechanism according to the related art which is provided in the vehicle.

Figure 15:
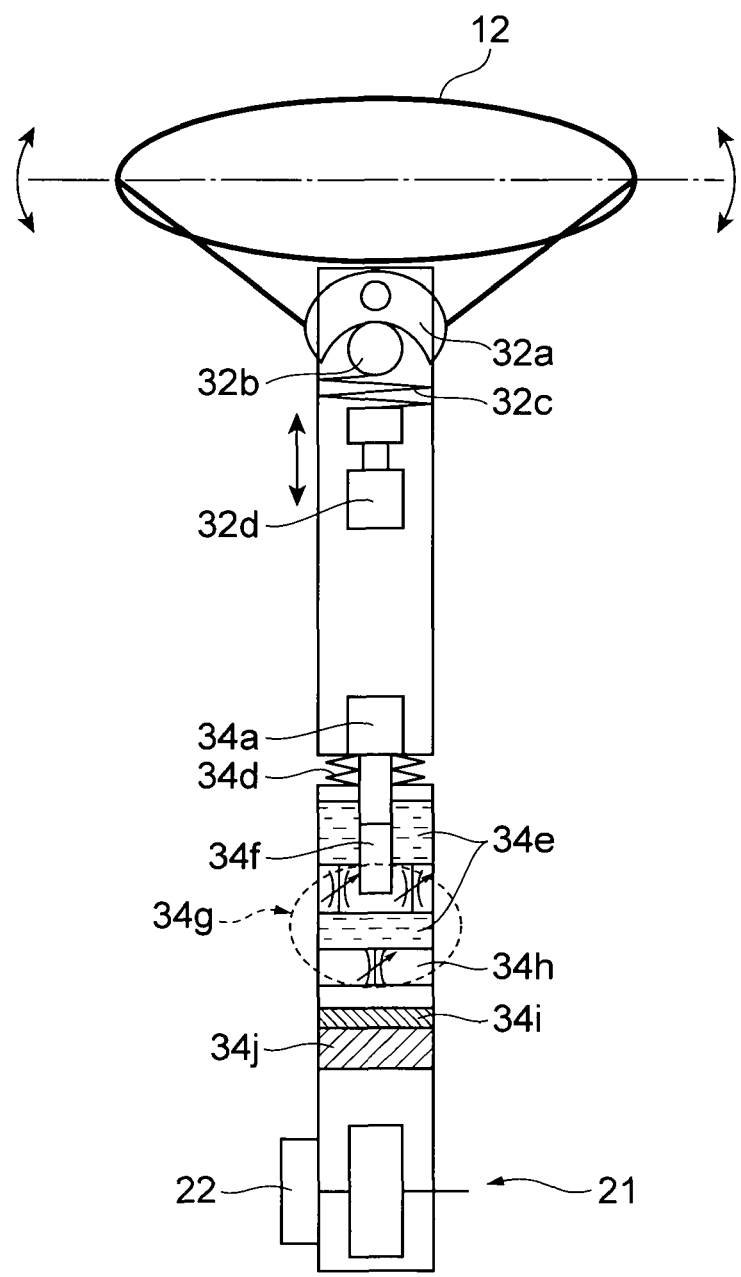
FIG. 15 is a diagram illustrating the structure of devices around a steering wheel according to a second embodiment.

Next, a second embodiment of the invention will be described. As shown in FIG. 15, in this embodiment, a steering control device includes, as a push-pull reaction force device 34, a middle point return spring 34d, oil 34e, a piston 34f, a damping force variable valve 34g, a base valve 34h, a free piston 34i, and a gas spring 34j. In this embodiment, the piston 34f, the damping force variable valve 34g, and the base valve 34h can be used to change the damping force of motion in the push-pull direction. The free piston 34i and the gas spring 34j are provided in order to absorb volume when the slide shaft 34a is moved to the piston 34f. In this way, in this embodiment, it is possible to change the reaction force in the push-pull direction by changing the damping force of motion in the push-pull direction.

The embodiments of the invention have been described above, but the invention is not limited to the above-described embodiments. Various modifications of the invention can be made.

INDUSTRIAL APPLICABILITY

According to the steering control device of the invention, it is possible to give an appropriate reaction force to the driver.

REFERENCE SIGNS LIST

10: STEERING CONTROL DEVICE
11: STEERING SHAFT
12: STEERING WHEEL
14: STEERING ANGLE SENSOR
16: TILT ANGLE SENSOR
18: PUSH-PULL STROKE SENSOR
20: TELESCOPIC AMOUNT SENSOR
21: TILT/EXPANSION MECHANISM
22: TILT AMOUNT SENSOR
24: VEHICLE SPEED SENSOR
26: CPU
28: STEERING DEVICE
30: TIRE
32: TILT REACTION FORCE DEVICE
32a: CAM MECHANISM
32b: BALL
32c: SPRING
32d: ACTUATOR
34: PUSH-PULL REACTION FORCE DEVICE
34a: SLIDE SHAFT
34b: SPRING
34c: ACTUATOR
34d: MIDDLE POINT RETURN SPRING
34e: OIL
34f: PISTON
34g: DAMPING FORCE VARIABLE VALVE

34*h*: BASE VALVE
34*i*: FREE PISTON
34*j*: GAS SPRING

The invention claimed is:

1. A steering control device comprising:
a reference position adjusting unit that adjusts a reference position of a steering wheel relative to a driver;
a steering unit that steers a host vehicle according to an amount of steering corresponding to a first operation amount of the steering wheel by the driver in a first direction;
a steering angle change unit that changes the amount of steering corresponding to the first operation amount required for the steering unit to steer the host vehicle, depending on a second operation amount of the steering wheel by the driver in a second direction; and
a reaction force generating unit that generates a reaction force against the second operation amount for moving the steering wheel from the reference position according to the reference position of the steering wheel relative to the driver which is adjusted by the reference position adjusting unit, wherein
the first operation amount is a rotation angle of the steering wheel about the rotating shaft, and
the second operation amount is the amount of movement of the steering wheel at the reference position in at least one of a direction parallel to the rotating shaft of the steering wheel and a direction in which the steering wheel is tilted.

2. The steering control device according to claim 1, wherein the reaction force generating unit increases the reaction force against the second operation amount for moving the steering wheel from the reference position as the reference position of the steering wheel relative to the driver which is adjusted by the reference position adjusting unit becomes closer to the driver, and decreases the reaction force against the second operation amount for moving the steering wheel from the reference position as the reference position of the steering wheel relative to the driver which is adjusted by the reference position adjusting unit becomes further away from the driver.

3. The steering control device according to claim 1, wherein the steering angle change unit changes the amount of change in the amount of steering corresponding to the first operation amount required for the steering unit to steer the host vehicle depending on the second operation amount for moving the steering wheel from the reference position, according to the reference position of the steering wheel relative to the driver which is adjusted by the reference position adjusting unit.

4. The steering control device according to claim 3, wherein the steering angle change unit decreases the amount of change in the amount of steering corresponding to the first operation amount required for the steering unit to steer the host vehicle depending on the second operation amount for moving the steering wheel from the reference position as the reference position of the steering wheel relative to the driver which is adjusted by the reference position adjusting unit becomes closer to the driver, and increases the amount of change in the amount of steering corresponding to the first operation amount required for the steering unit to steer the host vehicle depending on the second operation amount for moving the steering wheel from the reference position as the reference position of the steering wheel relative to the driver which is adjusted by the reference position adjusting unit becomes further away from the driver.

5. The steering control device according to claim 1, wherein the reference position adjusting unit can adjust an absolute height of the reference position of the steering wheel, and
the reaction force generating unit generates the reaction force against the second operation amount for moving the steering wheel from the reference position, according to the absolute height of the reference position of the steering wheel adjusted by the reference position adjusting unit.

6. The steering control device according to claim 5, wherein the reference position adjusting unit increases the reaction force against the second operation amount for moving the steering wheel from the reference position as the absolute height of the reference position of the steering wheel adjusted by the reference position adjusting unit increases, and decreases the reaction force against the second operation amount for moving the steering wheel from the reference position as the absolute height of the reference position of the steering wheel adjusted by the reference position adjusting unit decreases.

7. The steering control device according to claim 5, wherein the reference position adjusting unit adjusts an inclination angle of the rotating shaft of the steering wheel in a front-rear direction of the host vehicle to adjust the absolute height of the reference position of the steering wheel.

* * * * *